(12) United States Patent
Corretja et al.

(10) Patent No.: US 10,591,583 B2
(45) Date of Patent: Mar. 17, 2020

(54) METHOD FOR PROCESSING A RADAR SIGNAL IN LAND/SEA DETECTION MODE; PROCESSING SYSTEM AND ASSOCIATED COMPUTER PROGRAM PRODUCT

(71) Applicant: THALES, Courbevoie (FR)

(72) Inventors: Vincent Corretja, Pessac (FR); Gilles Guerrini, Pessac (FR); Richard Montigny, Elancourt (FR); David Thierry Sfez, Elancourt (FR)

(73) Assignee: Thales, Courbevoie (FR)

( * ) Notice: Subject to any disclaimer, the term of this patent is extended or adjusted under 35 U.S.C. 154(b) by 354 days.

(21) Appl. No.: 15/521,077

(22) PCT Filed: Oct. 23, 2015

(86) PCT No.: PCT/EP2015/074590
§ 371 (c)(1),
(2) Date: Apr. 21, 2017

(87) PCT Pub. No.: WO2016/066540
PCT Pub. Date: May 6, 2016

(65) Prior Publication Data
US 2017/0343647 A1    Nov. 30, 2017

(30) Foreign Application Priority Data
Oct. 28, 2014  (FR) ..................... 14 02433

(51) Int. Cl.
*G01S 7/292*    (2006.01)
*G01S 13/42*    (2006.01)
(Continued)

(52) U.S. Cl.
CPC .......... *G01S 7/2927* (2013.01); *G01S 13/426* (2013.01); *G01S 13/428* (2013.01); *G01S 13/505* (2013.01); *G01S 13/5242* (2013.01); *Y02A 10/41* (2018.01)

(58) Field of Classification Search
CPC .... G01S 7/2927; G01S 13/505; G01S 13/428; G01S 13/426; G01S 13/5242;
(Continued)

(56) References Cited

U.S. PATENT DOCUMENTS 3,680,094 A * 7/1972 Bayle ..................... G01S 13/94
                                                    342/65
3,806,923 A * 4/1974 Tsuruta ................ G01S 7/2923
                                                    342/159
(Continued)

OTHER PUBLICATIONS

G. Jia et al., "An Effective Approach for Selection of Terrain Modeling Methods"; IEEE Geoscience and Remote Sensing Letters; vol. 10, No. 4; Jul. 2013; pp. 875-879; published by IEEE, Piscataway, New Jersey, USA. (Year: 2013).*

(Continued)

*Primary Examiner* — Bernarr E Gregory
(74) *Attorney, Agent, or Firm* — Thompson Coburn LLP; Steven M. Ritchey (57) ABSTRACT

A method (100; 200) for digital signal processing (S(t)) of a pulse and scanning radar during an observation of a coastal zone in land/sea detection mode, the signal being sampled according to a two-dimensional temporal map, a distance dimension (d) and a recurrence dimension (rec), comprising: selecting a digital terrain model file (MNT) of the observed coastal zone; transforming (110; 210) the temporal map and/or the digital terrain model file to obtain a transformed temporal map and/or a transformed digital terrain model file the data of which are expressed in a common reference frame; constructing (120) a mask (MT; MF) from the (Continued)

transformed digital terrain model file; and applying (130) the mask to the samples (E(d, rec); E(d, Δf)) of the map associated with the transformed temporal map, in such a way as to obtain filtered samples (Ef(d, rec); Ef(d, Δf)).

11 Claims, 5 Drawing Sheets

(51) Int. Cl.
*G01S 13/50* (2006.01)
*G01S 13/524* (2006.01)
*G01S 13/00* (2006.01)

(58) Field of Classification Search
CPC ...... G01S 13/528; G01S 13/536; G01S 13/94; G01S 7/292; G01S 7/021; G01S 7/2922; G01S 7/2923; Y02A 10/41
See application file for complete search history.

(56) References Cited

U.S. PATENT DOCUMENTS

| | | | | |
|---|---|---|---|---|
| 3,831,174 A | * | 8/1974 | King | G01S 13/528 342/104 |
| 4,159,477 A | * | 6/1979 | Le Beyec | G01S 7/2922 342/93 |
| 4,233,604 A | * | 11/1980 | Lepere | G01S 7/2927 342/159 |
| 5,166,692 A | * | 11/1992 | McClain | G01S 7/021 342/192 |
| 6,622,118 B1 | * | 9/2003 | Crooks | G01S 7/292 702/190 |
| 6,885,334 B1 | | 4/2005 | Hager et al. | |
| 8,519,882 B2 | * | 8/2013 | Huizing | G01S 13/536 342/25 A |
| 2010/0176984 A1 | | 7/2010 | Kemkemian et al. | |
| 2012/0127019 A1 | * | 5/2012 | Nishiyama | G01S 7/2927 342/93 |
| 2013/0342382 A1 | | 12/2013 | Maeno | |

OTHER PUBLICATIONS

Wang et al., "Range-Time-Frequency Representation of a Pulse Doppler Radar Imaging System for Indoor Localization and Classification", Proceedings of IEEE Topical Conference on Wireless Sensors and Sensor Networks (WiSNet), Jan. 20, 2013-Jan. 23, 2013, pp. 34-36.
French Search Report and Written Opinion of French Application No. 1402433 dated Jun. 24, 2015.
International Search Report and Written Opinion for PCT/EP2015/074590 in French, dated Jan. 13, 2016.
English translation of International Search Report for PCT/EP/2015/074590 dated Jan. 13, 2016.

* cited by examiner

PRIOR ART

METHOD FOR PROCESSING A RADAR SIGNAL IN LAND/SEA DETECTION MODE; PROCESSING SYSTEM AND ASSOCIATED COMPUTER PROGRAM PRODUCT

CROSS-REFERENCE TO RELATED APPLICATIONS

This application is a U.S. National Phase application of PCT/EP2015/074590, filed on Oct. 23, 2015, claiming the benefit of FR Application No. 1402433, filed Oct. 28, 2014, both of which are incorporated herein by reference in their entireties.

BACKGROUND OF THE INVENTION

The invention relates to the field of methods for processing a radar signal in land/sea detection mode.

A mechanically or electronically scanned pulse radar, for example carried by a sea surveillance airplane, is said to be pulsed when it periodically emits an electromagnetic pulse.

The signal received in return by the radar is first converted into a digital signal by passing through an analog pretreatment stage and an analog/digital conversion stage.

Figure 1:
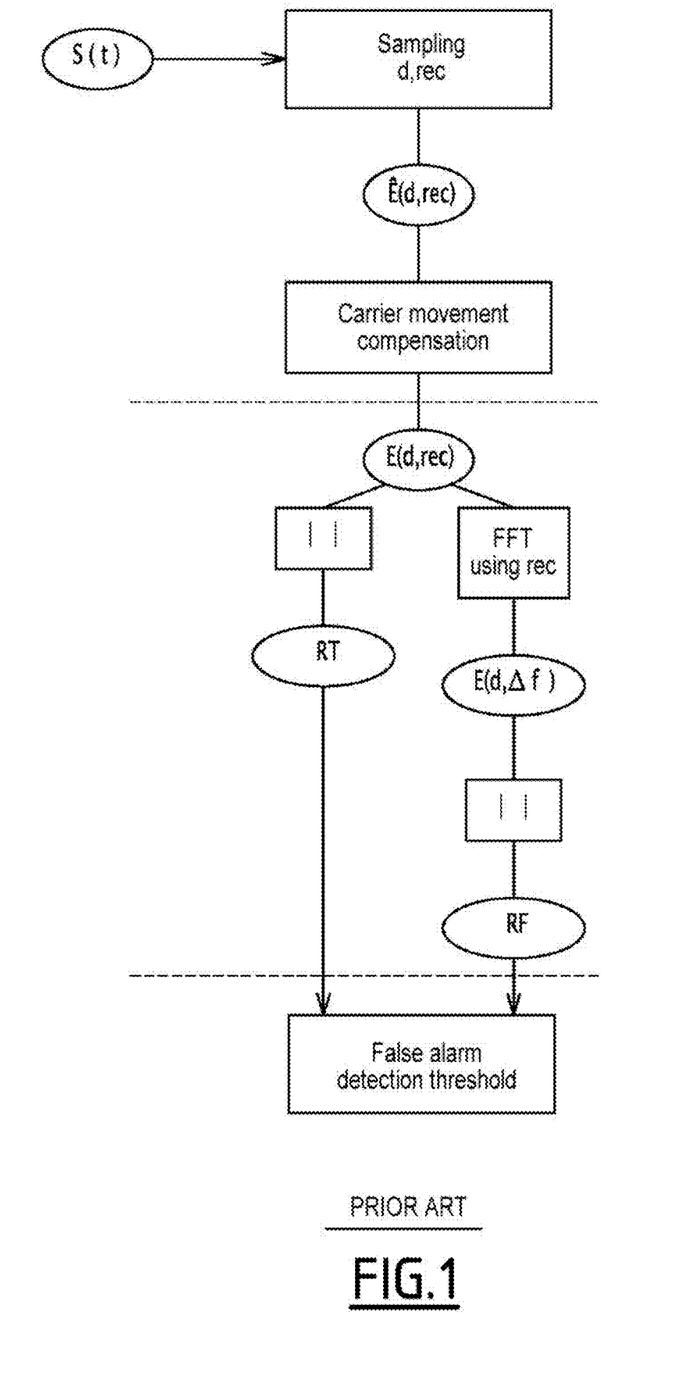
FIG. 1 is a schematic illustration of processing methods according to the state of the art.

Then, as shown in FIG. 1, the resulting digital signal, S(t), depending on the time t, is next sampled using a two-dimensional sampling temporal map. The signal is sampled both using a short time, corresponding to a distance dimension d, and using a long time, corresponding to a recurrence dimension rec. The recurrence dimension is equivalent to azimuth angular information $\varphi$. Below, we will refer indifferently to recurrence or angle for this temporal dimension.

A distance sampling interval, or range bin, corresponds to the distance resolution of the radar. Likewise, a recurrence sampling interval, or recurrence bin, corresponds to the angular resolution of the radar.

After the sampling step, which makes it possible to obtain raw distance/recurrence samples $\hat{E}(d,rec)$, the processing of the signal continues with a step for compensating movements of the airplane, so as to obtain distance/recurrence samples. Each distance/recurrence sample E(d,rec) is associated with a cell of the temporal map, identified by a distance bin d and a recurrence bin rec.

Then, in the case of non-coherent detection processing, the power of each distance/recurrence sample is computed, then associated with the corresponding cell so as to obtain a distance/recurrence representation, called temporal representation (RT), of the zone observed by the radar.

Furthermore, in the case of coherent treatment, a rapid Fourier transform RFT may be applied, using the recurrence dimension, to the distance/recurrence samples E(d,rec), so as to sample the signal S(t) using a dimension corresponding to Doppler frequency information $\Delta f$, dual for the recurrence dimension. A Doppler frequency sampling interval, or frequency bin, corresponds to the frequency resolution of the radar. Distance/Doppler frequency samples E(d, $\Delta f$) are thus obtained.

Then, the power of each distance/Doppler frequency sample E(d, $\Delta f$) is computed, and associated with the corresponding cell so as to obtain a distance/Doppler frequency representation, called frequency representation (RF), of the zone observed by the radar.

After these processing steps of the signal, detection processing is applied on the temporal representation RT and/or on the frequency representation RF, to identify targets.

In general, the signal S(t) includes useful echoes, corresponding to targets of interest that one wishes to detect, and stray echoes, in particular made up of the land clutter or sea clutter. Land clutter corresponds to obstacles on the surface of the land (buildings, vegetation, etc.), and sea clutter corresponds to obstacles on the surface of the sea (waves). These obstacles return an echo toward the radar. The land clutter and sea clutter have characteristic and known imprints, in particular frequency imprints.

In a first step of the detection processing, a detection threshold is applied on the used representation (RT or RF) to select only the cells whose power is above this threshold. The samples corresponding to these selected cells constitute detections.

The detection processing is done so as to obtain a constant false alarm rate (meaning a detection that is not actually a target). To that end, the detection threshold is computed dynamically based on the number of detections to which the application of a certain threshold level leads. For example, if the zone to be observed is a sea surface, the detection threshold will be low. Conversely, if the zone to be observed is a land surface, the threshold will be high. Indeed, the land reflectivity coefficient being higher than that of the sea, land generates many stray echoes. These will be considered detections, if the threshold level remains low. The threshold is consequently raised for a land surface.

However, to monitor a coastal zone, the zone observed by the radar, then working in land/sea mode, may include both a land surface and a sea surface.

Yet the land surface constitutes a disruptive element in detecting targets on the surface of the water. Indeed, if the detection threshold is not raised, the stray echoes from the land surface lead to a false alarm rate that increases uncontrollably. Furthermore, the number of detections to be monitored increases the computing load. Lastly, the high number of false alarms causes a confusing tactical situation.

Thus, near the coast, the detection threshold is raised. It is then no longer optimized for detecting small targets on the surface of the water, small targets being characterized by a low Surface Equivalent Radar (SER). Consequently, the likelihood of detecting targets with a low SER is downgraded in land/sea detection mode.

The invention therefore aims to resolve this problem.

BRIEF SUMMARY OF THE INVENTION

The invention relates to a method for digital signal processing of an electronically or mechanically scanned pulse radar during an observation of a coastal zone in land/sea detection mode, said signal being sampled according to a two-dimensional temporal sampling map, one dimension corresponding to a distance d from the radar and the other dimension corresponding to a recurrence rec of pulsed emission by the radar, characterized in that it includes:

selecting a digital terrain model file corresponding to the observed coastal zone;

transforming the temporal sampling map and/or at the digital terrain model file to obtain a transformed temporal sampling map and/or a transformed digital terrain model file whose data are expressed in a shared reference;

constructing a mask from the transformed digital terrain model file; and applying said mask to the samples of a sampling map associated with the transformed temporal sampling map, so as to obtain filtered samples.

The invention consists of using a digital terrain model (MNT file hereinafter). This is a digital file associating each geographical point with the positive altitude of that point. In such a file, a point belonging to the surface of the sea is for example associated with an infinitely negative altitude.

More specifically, the invention consists of exploiting a priori the information contained in such a MNT file on the presence of land and sea in the zone observed by the radar, during processing of the signal, upstream from the detection processing.

To that end, a mask is constructed from a MNT file and is applied on the samples before determining temporal or frequency representations, and consequently before the dynamic computation of the detection threshold to be applied to these representations.

Thus, advantageously, the detection threshold for a land/sea detection mode can remain low, making it possible to benefit from maximal sensitivity for detecting targets on the surface of the sea, in particular near the coast, while avoiding a high false alarm rate.

This approach makes it possible to limit the number of false alarms and offer a less confusing tactical situation. It lightens the computational complexity, since it is only necessary to monitor a small number of detections within the observed zone.

According to specific embodiments, the method includes one or more of the following features, considered alone or according to any technically possible combinations:

the mask being a temporal mask, the step for constructing the temporal mask including initializing a temporal mask including a matrix of cells having as many distance bins and recurrence bins as the transformed temporal sampling map, and the allocation to each cell of the temporal mask of a value that depends on the proportion of the land surface to the surface defined by the cell in the transformed digital terrain model file;

the value of a cell of the temporal mask is a binary value, assuming the zero value when the considered cell contains the land surface, and the unit value when the cell includes only a sea surface;

the temporal mask is applied by weighting the sample of a cell of the transformed temporal sampling map, by the value of the corresponding cell of the temporal mask;

the mask being a frequency mask, the method further includes:

applying a time-frequency transform in the recurrence direction on the samples of the transformed temporal sampling map, so as to obtain samples associated with a two-dimensional frequency sampling map, one dimension corresponding to a distance from the radar and the other dimension corresponding to a Doppler frequency of the received echoes;

constructing a temporal mask including initializing a temporal mask including a matrix of cells having as many distance bins and recurrence bins as the transformed temporal sampling map, and the allocation to each cell of the temporal mask of a value that depends on the proportion of the land surface to the surface defined by said cell in the transformed digital terrain model file;

smoothing the temporal mask along the recurrence dimension so as to obtain a smoothed temporal mask with a dimension along the distance direction;

determining the frequency mask from the smoothed temporal mask; and applying the frequency mask to the samples of the frequency sampling map to obtain filtered samples.

the value of a cell of the temporal mask is a binary value, assuming the zero value when the considered cell contains the land surface, and the unit value when the cell includes only a sea surface according to the transformed digital terrain model file;

the temporal mask is smoothed along the recurrence dimension by associating the one value with the cells of a distance bin when all of the values of the cells of the temporal mask for this distance bin are equal to the one; the zero value, when all of the values of the cells of the temporal mask for this distance bin are zero; and otherwise, an intermediate value;

To determine the frequency mask from the smoothed temporal mask, one associates, with a cell of the filtered frequency mask:

the one value, when the cells of the corresponding distance bin of the smoothed temporal mask have the one value;

the zero value, when the cells of the corresponding distance bin of the smoothed temporal mask have the zero value; and otherwise the zero value if this cell coincides with a frequency imprint of the land clutter and the one value otherwise;

the frequency mask is applied by weighting the value of each sample by the value of the corresponding cell of the frequency mask (MF), to obtain filtered samples.

the method includes a step for computing a filtered temporal and/or frequency representation from filtered samples.

The invention relates to a radar processing system for the digital signal of an electronically or mechanically scanned pulse radar, able to carry out the preceding method.

The invention relates to a computer program product including instructions able to be executed by a computer of a radar processing system so as to carry out the preceding method.

BRIEF DESCRIPTION OF THE SEVERAL VIEWS OF THE DRAWINGS

The invention and its advantages will be better understood upon reading the following detailed description of one particular embodiment, provided solely as a non-limiting example, this description being done in reference to the appended drawings, in which.

DETAILED DESCRIPTION OF THE INVENTION

Figure 2:
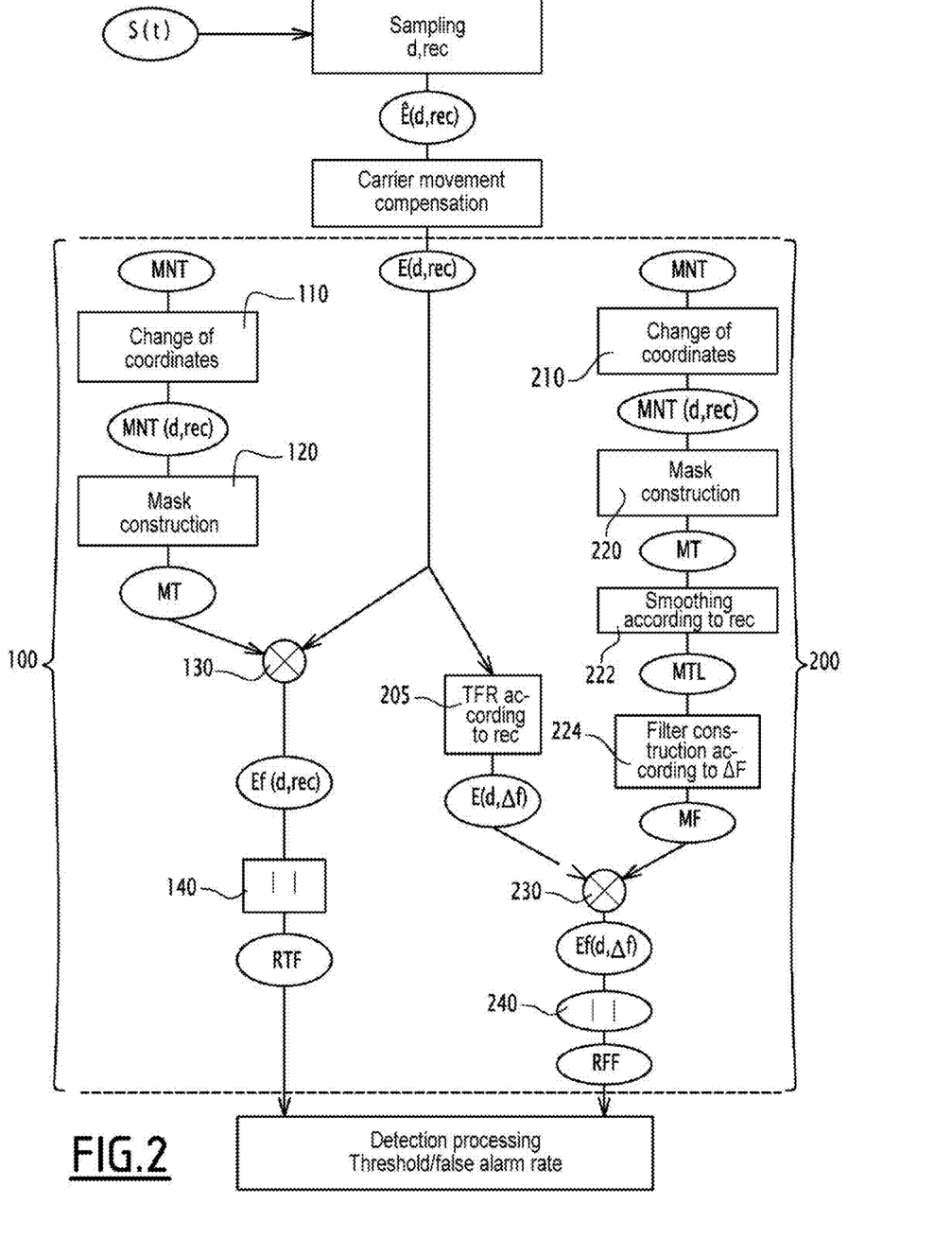
FIG. 2 is a schematic illustration of a first processing method and a second processing method according to the invention.

A first method 100, corresponding to a first embodiment of the processing method according to the invention, will now be described in reference to FIG. 2.

This first method is specific to a non-coherent detection processing, seeking to obtain a filtered temporal representation FTR of the coastal zone observed by the radar in land/sea mode.

In this first embodiment, a temporal mask MT is developed from a MNT file. The mask is applied on the distance/recurrence samples E(d,rec) so as to eliminate the samples that correspond to the land surface of the observed coastal zone, and retain only the samples that correspond to the sea surface.

In a step 110, a MNT file describing the geography of the observed coastal zone is transformed, using a change of reference, so as to express, in a shared reference, the information of the MNT file and the distance/recurrence temporal sampling map of the digital signal of the radar. A transformed MNT file, in distance and recurrence, MNT(d, rec) is obtained.

Alternatively, it is the temporal sampling map that is transformed to obtain a transformed temporal sampling map in the reference used by the MNT file. During this transformation, each cell of the initial map is matched with a single cell of the transformed map, such that the sample associated with a cell of the initial map is easily associated with the corresponding cell of the transformed map.

In still another alternative, the temporal sampling map and the MNT file are transformed.

In a step 120, a temporal mask MT is initialized. It is made up of a matrix of distance/recurrence cells having as many distance bins and recurrence bins as the distance/recurrence temporal sampling map.

Each cell, with x-axis d and y-axis rec, of the temporal mask MT is associated with a value p(d, rec). In the embodiment currently considered, the value associated with a cell is the value "1" when the entire surface corresponding to this cell in the transformed MNT file is made up of a sea surface; and the value "0" when at least a fraction of the surface corresponding to this cell in the transformed MNT file is made up of a land surface. The temporal mask MT thus constructed is a binary mask.

Figure 3:
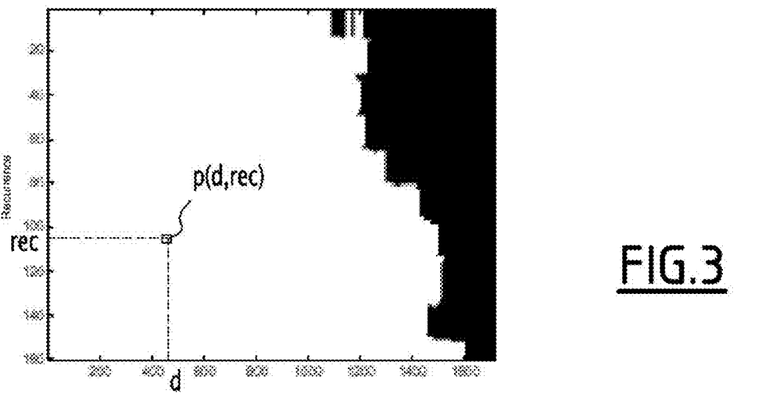
FIGS. 3 to 5 illustrate different temporal graphs when implementing the first method of FIG. 2.

One example of such a binary temporal mask is shown in FIG. 3.

Many alternative constructions of such a temporal mask can be considered. For example, the alternative described above could be generalized by associating each distance/recurrence cell of the temporal mask MT with the value of a function of the proportion of the surface of the cell which, according to the transformed MNT file, is made up of a land surface.

Then, in step 130, the temporal mask MT is applied to the distance/recurrence samples E(d,rec), so as to retain only the samples corresponding to a sea surface. More specifically, for cell with x-axis d and y-axis rec, the sample E(d,rec) is weighted by the value p(d,rec) of the temporal mask MT. The corresponding filtered sample is denoted Ef(d,rec).

Then, in step 140, the computation of the amplitude or squared amplitude of the filtered samples Ef(d, rec) leads to a filtered temporal representation RTF.

Figure 4:
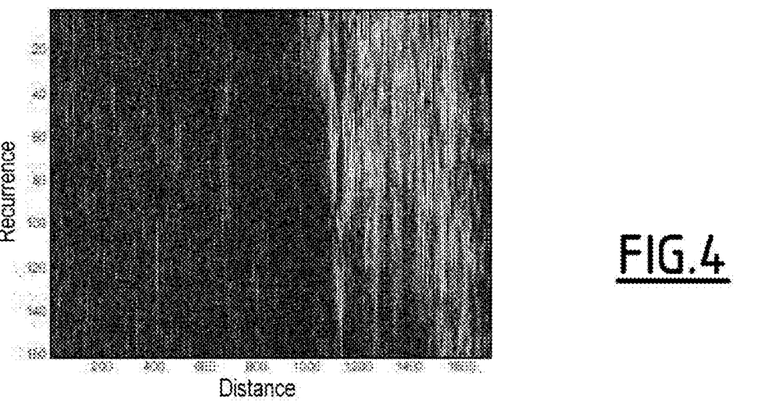
Figure 5:
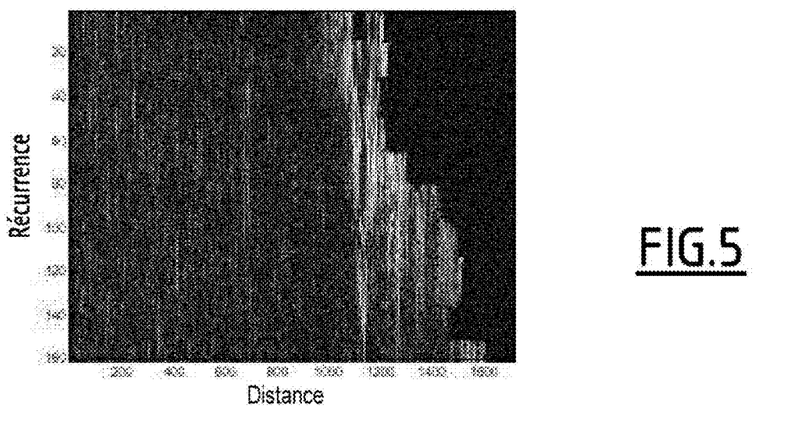

One such filtered temporal representation is shown in FIG. 5, while the equivalent non-filtered temporal representation RT (obtained after carrying out the method according to the prior art) is shown in FIG. 4.

Downstream from the method 100, the filtered temporal representation RTF is used in the detection processing. The detection threshold that is applied to it is re-sensitized, meaning that the level of the detection threshold may remain low, since the filtered temporal representation does not include stray echoes coming from the land surface and the number of detection, used in the dynamic computation of the threshold, consequently remains low.

A second method 200, corresponding to a second embodiment of the processing method according to the invention, will now be described also in reference to FIG. 2.

This second method is specific to a coherent detection processing, seeking to obtain a filtered frequency representation RFF of the coastal zone observed by the radar in land/sea detection mode.

In this second embodiment, the method 200 includes a time-frequency transformation step 205, of the fast Fourier transform type, of the distance/recurrence samples E(d,rec) using the recurrence dimension. Each distance/Doppler frequency sample E(d, Δf) thus obtained is associated with a cell, with x-axis d and y-axis Δf, of a frequency sampling map.

The method 200 includes a step 210, similar to the step 110, making it possible to express the information from the MNT file describing the coast of the observed coastal zone in a reference shared with the distance/recurrence temporal sampling map of the signal. A transformed MNT file, in distance and recurrence, MNT(d,rec) is obtained.

In step 220, similar to step 120, a temporal mask MT is initialized. It is made up of a matrix of cells having as many distance bins and recurrence bins as the temporal sampling map. Each cell of the temporal mask MT is associated with a binary value p(d,rec) equivalent to "1" when the entire surface corresponding to the cell in question in the transformed MNT file is a sea surface; and "0" when at least part of the surface of the cell in the transformed MNT file is a land surface. One example of such a temporal mask MT is shown schematically in FIG. 6.

Then, in a step 222, the temporal mask MT is transformed using a processing dimension, in the case at hand the recurrence dimension, to obtain a smoothed temporal mask MTL.

A smoothed temporal mask MTL is initialized. It is made up of a matrix of cells having as many distance bins and recurrence bins as the temporal sampling mask MT.

For each distance bin of the temporal mask, the mean value of the corresponding recurrence bins is computed.

If this mean value is equal to one, i.e., if all of the cells of this distance bin correspond to a sea surface, the value q(d,rec) of the cells of the smoothed temporal mask MTL for the considered distance bin is equal to one.

If this mean value is zero, i.e., if all of the cells of this distance bin correspond to a land surface, the value q(d,rec) of the cells of the smoothed temporal mask MTL for this distance bin is zero.

If this mean value is between "0" and "1", i.e., if for this distance bin, some cells exist that correspond to a sea surface and others that correspond to a land surface, the value q(d,rec) of the cells of the smoothed temporal mask MTL for this distance bin assume an intermediate value, for example 0.5.

Figure 6:
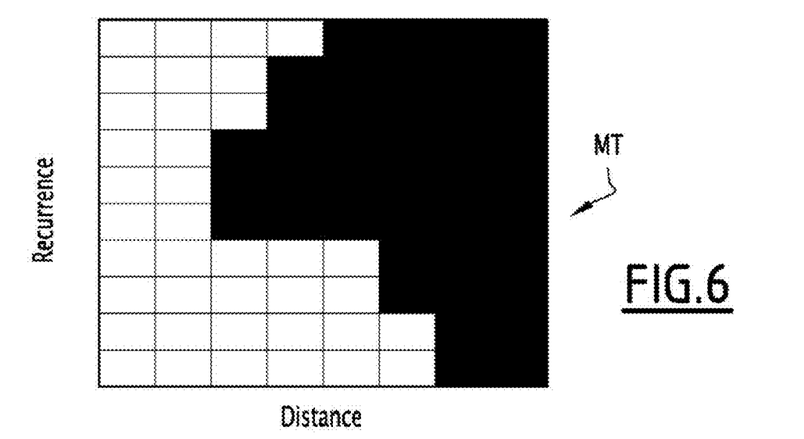
FIGS. 6 to 8 schematically illustrate different masks computed when implementing the second method of FIG. 2.
Figure 7:
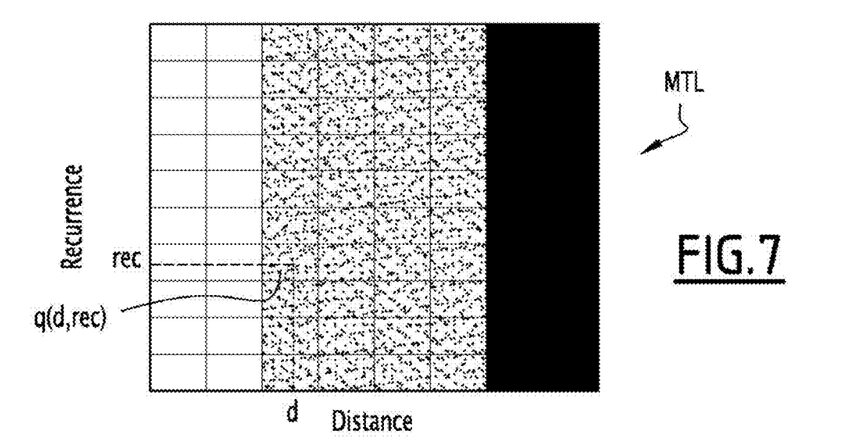

FIG. 7 shows one such smoothed temporal mask MTL obtained from the temporal mask MT of FIG. 6.

The smoothed temporal mask MTL constitutes a representation of a dimension, in the case at hand, distance.

Step 224 next consists of obtaining a frequency mask MF with two distance/Doppler frequency dimensions from the smoothed temporal mask MTL.

A frequency mask MF is initialized. It is made up of a matrix of cells having as many distance bins and Doppler frequency bins as the frequency sampling mask for distance/Doppler frequency of the signal.

Each cell, with x-axis d and y-axis Δf, of the frequency mask MF is associated with a value r(d, Δf).

For each distance bin where the value q(d,rec) of the smoothed temporal mask MTL is equal to "1" ("0", respectively), the value q(d, Δf) of the cells of the frequency mask MF at this distance bin are initialized with the value "1" ("0", respectively).

For each distance bin where the value q(d,rec) of the smoothed temporal mask MTL is equal to "0.5", the value r(d, Δf) of the cells of the frequency mask MF at this distance bin is initialized at the value "1" or the value "0" so as to eliminate the frequency imprint of the land clutter. The frequency imprint of the land clutter is determined based on the values derived from the literature. Being generated by essentially static obstacles, the frequency imprint of the land clutter is centered around the zero Doppler frequency. Thus, for such a distance bin, the cells around the zero Doppler frequency assume the value "0" to conceal the land clutter, and the other cells assume the value "1".

Figure 8:
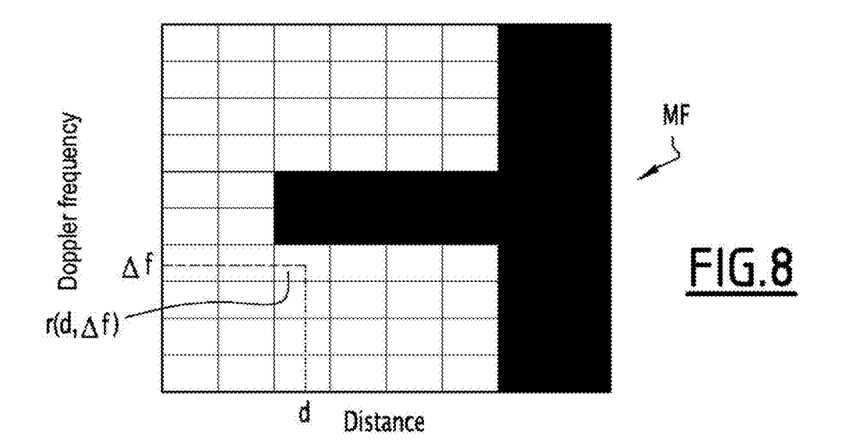

A frequency mask MF obtained from the smoothed temporal mask MTL of FIG. 7 is shown schematically in FIG. 8.

The frequency mask MF developed in step 230 is applied to the distance/Doppler frequency samples E(d, Δf) so as to eliminate the stray echoes originating from the land surface, in particular the land clutter.

More particularly, a distance/Doppler frequency sample E(d,Δf) is weighted by the value q(d, Δf) of the frequency mask MF. The obtained filtered sample is denoted Ef(d,Δf).

Then, in step 240, the computation of the amplitude or squared amplitude of a filtered sample Ef(d,Δf) leads to a filtered frequency representation RFF.

Figure 9:
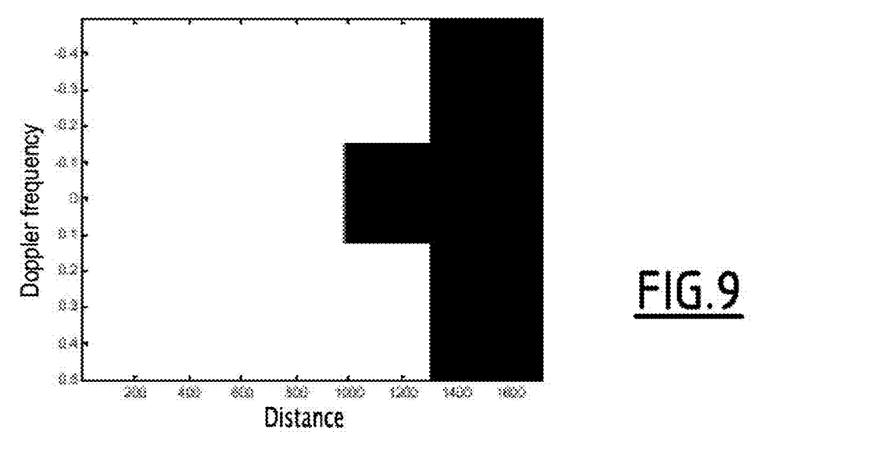
FIGS. 9 to 11 illustrate different spectral graphs when implementing the second method of FIG. 2.
Figure 10:
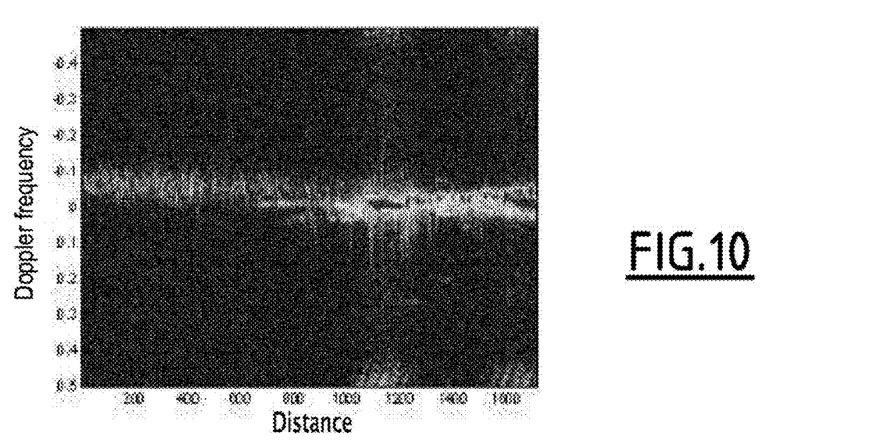
Figure 11:
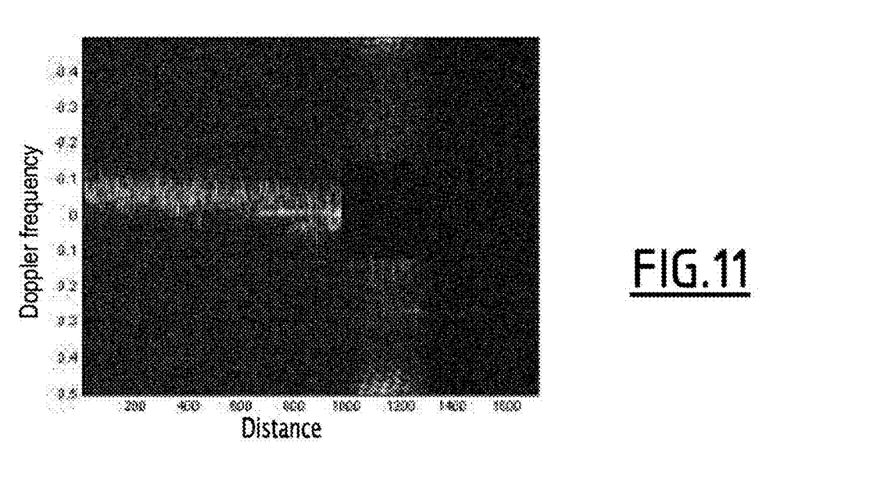

One such filtered frequency representation is shown in FIG. 11, while the equivalent non-filtered frequency representation is shown in FIG. 10. The depiction of FIG. 11 was obtained by using the frequency mask MF of FIG. 9, which deviates from the temporal mask MT of FIG. 3.

Downstream from the method 200, the filtered frequency representation RFF is used in detection processing. The detection threshold applied on this representation is re-sensitized, i.e., the detection threshold level remains low, since this representation includes few or no stray echoes caused by the land surface.

Many alternatives of the above methods may be considered.

For example, the temporal mask could be applied to the distance/recurrence samples, then a fast Fourier transform applied to the filtered samples, to obtain distance/Doppler frequency samples.

However, in this alternative, after filtering by applying the mask, the number of distance/recurrence samples using the application dimension of the fast Fourier transform may be insufficient to obtain a satisfactory frequency resolution. As a result, target detection as close as possible to the coast becomes problematic. The second method described above is then more advantageous, since it makes it possible to resolve this problem.

The main advantage of the present processing method lies in re-sensitizing the detection processing in land/sea detection mode, so as to be able to detect low SER targets on the surface of the sea, as close as possible to the coasts.

The invention claimed is:

1. A method for processing a digital signal of an electronically or mechanically scanned pulse radar during an observation of a coastal zone in a land and sea detection mode, the digital signal being sampled according to a two-dimensional temporal sampling map, one dimension corresponding to a distance from the radar and the other dimension corresponding to a recurrence of emission of pulses by the radar, wherein the method includes:
  selecting a digital terrain model file corresponding to the coastal zone observed;
  transforming the temporal sampling map and the digital terrain model file to obtain a transformed temporal sampling map and a transformed digital terrain model file whose data are expressed in a shared reference frame;
  constructing a mask from the transformed digital terrain model file; and
  applying said mask to the samples of a sampling map associated with the transformed temporal sampling map, so as to obtain filtered samples.

2. The method according to claim 1, wherein the mask is a temporal mask and the step for constructing the mask includes:
  initializing a temporal mask including a matrix of cells having as many distance bins and recurrence bins as the transformed temporal sampling map; and
  allocating a value to each cell of the temporal mask, said value depending on a proportion of land surface to a surface defined by the cell in the transformed digital terrain model file.

3. The method according to claim 2, wherein the value allocated to a cell of the temporal mask is a binary value, assuming the zero value when the considered cell contains a land surface, and the unit value when the cell includes only sea surface.

4. The method according to claim 2, wherein the temporal mask is applied by weighting the sample of a cell of the transformed temporal sampling map, by the value of the corresponding cell of the temporal mask.

5. The method according to claim 1, wherein the mask is a frequency mask and the method further includes:
  applying a time-frequency transform in the recurrence direction on the samples of the transformed temporal sampling map, so as to obtain samples associated with a two-dimensional frequency sampling map, one dimension corresponding to a distance from the radar and the other dimension corresponding to a Doppler frequency of received echoes;
  constructing a temporal mask including a matrix of cells having as many distance bins and recurrence bins as the transformed temporal sampling map, and allocating a value to each cell of the temporal mask, said value depending on a proportion of land surface to a surface defined by said cell in the transformed digital terrain model file;
  smoothing the temporal mask along the recurrence dimension so as to obtain a smoothed temporal mask with one dimension along the distance direction;
  determining the frequency mask from the smoothed temporal mask; and
  applying the frequency mask to the samples of the frequency sampling map to obtain the filtered samples.

6. The method according to claim 5, wherein the value allocated to a cell of the temporal mask is a binary value, assuming the zero value when the considered cell contains a land surface, and the unit value when the cell includes only sea surface according to the transformed digital terrain model file.

7. The method according to claim 6, wherein the temporal mask is smoothed along the recurrence dimension by associating:

the unit value to the cells of a distance bin when all of the values of the cells of the temporal mask for said distance bin are equal to one;

the zero value to the cells of said distance bin when all of the values of the cells of the temporal mask for said distance bin are equal to zero; and an intermediate value otherwise.

8. The method according to claim 5, wherein the determination of the frequency mask from the smoothed temporal mask comprises associating with a cell of the filtered frequency mask:

the unit value when the cells of the corresponding distance bin of the smoothed temporal mask have the unit value;

the zero value when the cells of the corresponding distance bin of the smoothed temporal mask have the zero value; and otherwise the zero value if the cell coincides with a frequency imprint of a land clutter and the unit value if not.

9. The method according to claim 5, wherein the frequency mask is applied by weighting the value of each sample by the value of the corresponding cell of the frequency mask so as to obtain the filtered samples.

10. The method according to claim 1, wherein the method further includes computing a filtered temporal and/or frequency representation from the filtered samples.

11. A non-transitory computer readable medium stored within a computer, the non-transitory computer readable medium including instructions able to be executed by the computer of a radar processing system so as to carry out the method for processing the signal from the electronically or mechanically scanned pulse radar according to claim 1.

* * * * *